United States Patent [19]

Ward

[11] Patent Number: 4,599,973
[45] Date of Patent: Jul. 15, 1986

[54] LIVESTOCK TANK WATER HEATER

[76] Inventor: Richard E. Ward, 11040 4A Rd., Plymouth, Ind. 46563

[21] Appl. No.: 667,986

[22] Filed: Nov. 5, 1984

[51] Int. Cl.⁴ .......................... H05B 3/78; A01K 7/00
[52] U.S. Cl. ..................................... 119/73; 219/316; 219/437; 219/523
[58] Field of Search ............... 219/316, 317, 318, 322, 219/386, 331, 338, 346, 437, 523; 119/73

[56] References Cited

U.S. PATENT DOCUMENTS

| | | | |
|---|---|---|---|
| 2,378,772 | 6/1945 | Hummel | 219/316 |
| 2,561,932 | 7/1951 | Landgraf | 119/73 |
| 2,774,856 | 12/1956 | Paulsen et al. | 219/317 |
| 2,849,588 | 8/1958 | Marcuse | 219/318 X |
| 4,213,034 | 7/1980 | Goss et al. | 219/523 X |

*Primary Examiner*—Robert P. Swiatek
*Attorney, Agent, or Firm*—Wendell E. Miller

[57] ABSTRACT

A water heater (10 or 70) for a stock watering tank includes a first (20 or 72) housing portion of molded aluminum, and a second (62 or 94) housing portion of plastic. An electric heating element (12 or 74) is molded into the first housing portion. One of the housing portions includes a cavity (36 or 99). A thermostatically controlled switch (50) is inserted into the cavity and is bonded to the first housing portion.

19 Claims, 5 Drawing Figures

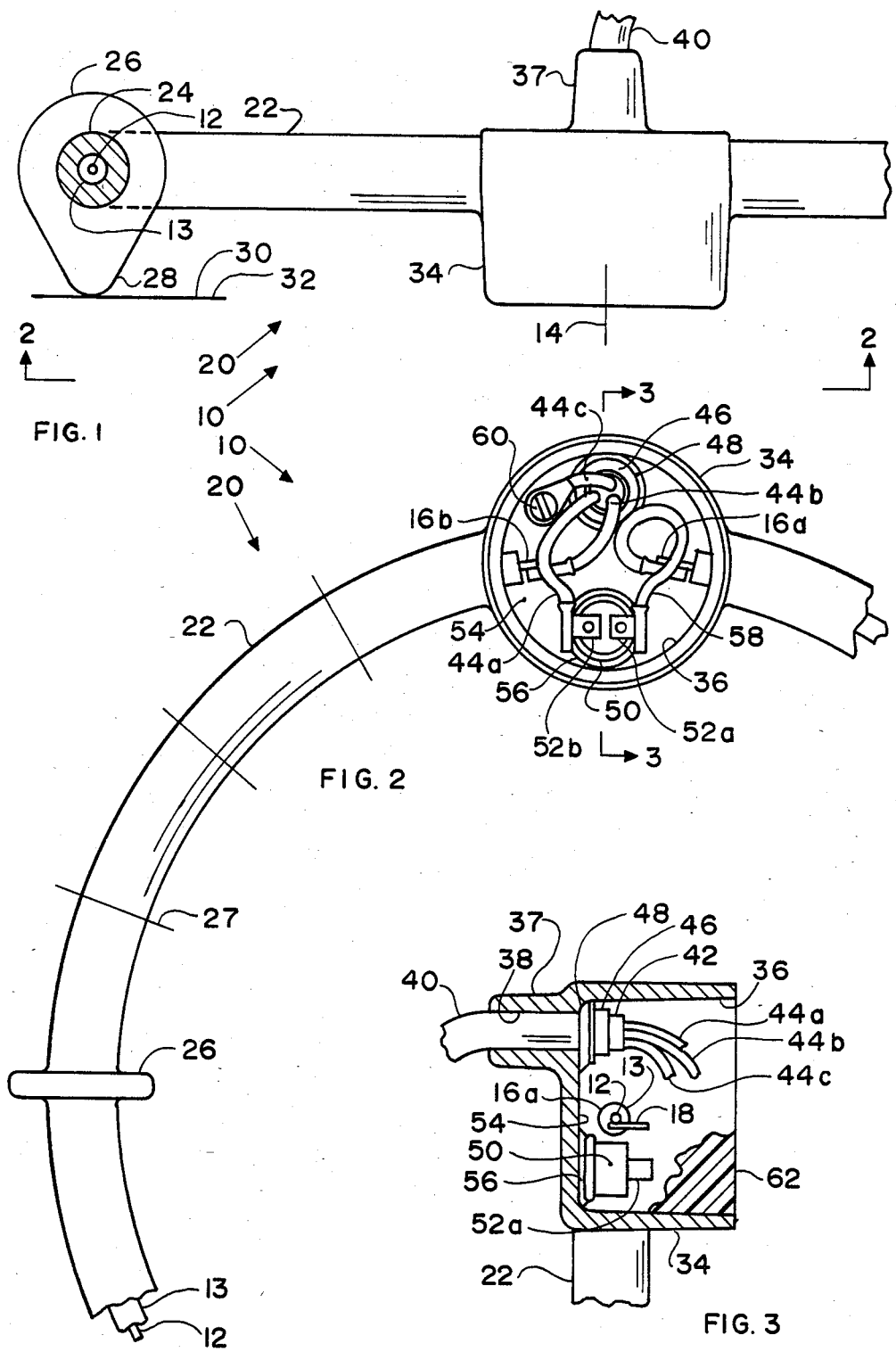

LIVESTOCK TANK WATER HEATER

TECHNICAL FIELD

The present invention relates generally to electric water heaters; and, more particularly the present invention relates to electric water heaters for use in watering tanks for livestock.

BACKGROUND ART

Electric heaters for livestock watering tanks have been of two general types. One type has been the submerged heater that rests on the bottom of the watering tank. The other type has been the floating water heater.

Typical of the submerged type is that which is described by McKinstry in U.S. Pat. No. 4,068,116. In this patent, McKinstry discloses a unit in which plates are placed above and below the heating element to protect it from accidental damage, and in which a metal band senses the temperature of the heating element and transfers the heat to a thermostat.

Typical of the floating type is the unit which is described by Landgraf in U.S. Pat. No. 2,561,932. Landgraf suspends the heating element beneath a float.

Also typical of the floating type are the units which are disclosed by Brodie in U.S. Pat. No. 2,430,272, Rietz in U.S. Pat. No. 2,454,091, and Temple in U.S. Pat. No. 2,472,178.

All of the above designs, both submerged and floating, have one weakness in common: none of them accurately sense the temperature of the heating element.

It is important to accurately sense the temperature of the heating element because, otherwise, if the water heater is accidently thrown out of the watering tank by a drinking animal, it may become hot enough to start a fire in straw, or other combustible material, with resulting loss of property and livestock.

McKinstry recognized the need to communicate the temperature of the heating element to the thermostat; but he attempted to transfer the heat with a thin and elongated metal strip. However, using the elongated metal strip, the heat transfer not only would be relatively slow, but highly inaccurate.

Further, McKinstry did not disclose any provision for making intermetallic contact between the heating element and the metal strip, or between the metal strip and the thermostat by bonding, so there is little assurance of good heat transfer in a new unit, and no assurance of good heat transfer in a unit that has oxidized or corroded.

In addition to the above-mentioned problems of transferring heat through the metal strip of McKinstry, when the heater is submerged in water, the water would cool the metal strip before the metal strip could transfer heat from the heating element to the thermostat. So, in actuality, the thermostat of McKinstry would sense water temperature when the heater is in the water, and would be inaccurate and unreliable in sensing the temperature of the heating element if accidentally removed from the livestock watering tank.

None of the prior art inventors, as listed above, seemed to recognize the need of sensing the temperature of the heating element as a safety factor. Brodie intentionally senses ambient air temperature; and the others sense water temperature rather than heating element temperature.

That is, the thermostat of Landgraf is so remote from the element that it is apparent that he was only considering the sensing of water temperature; and, by inspection, it is apparent that the conductivity between water and the heating element, and between water and the thermostat, are both greater than the conductivity between the heating element and the thermostat in the unit which is disclosed by Temple.

In addition, because all of the prior art, as listed above, either directly exposes the heating element to the water, or else bonds the heating element to the outside of a thin metallic float, it appears that none of the prior art inventors have recognized the desirability of reducing the watt density of the heater as another means of reducing the danger of accidentally setting fires, and as a means for reducing the danger of burning the nose or mouth of a drinking animal.

Further, none of the prior art designs provide the structural ability to withstand physical abuse such as the weight of a horse or a cow. Even though McKinstry does place thin protective metal plates above and below the heating element, it is obvious that these metal plates would provide only superficial protection against accidental damage of the heating element.

Therefore, none of the prior art has disclosed, or suggested, a design in which the temperature of the heating element is closely controlled by a thermostat, or a unit in which accidental damage is prevented by adequate structural design.

DISCLOSURE OF INVENTION

In the present invention, a livestock tank water heater is provided in which the temperature of the heating element is conveyed to a thermostat by molding the heating element in an aluminum casting, and then bonding a thermostat to the aluminum casting.

In one preferred embodiment, the water heater is of the floating type. The specific gravity is kept below 1.0 by utilizing a plastic top to the housing; and the strength of the plastic top is enhanced by including a foamed plastic liner.

In another preferred embodiment, the water heater is of the submerged type. A torrodial-shaped aluminum casting provides strength and decreases the watt density of the unit; and fins with downward projections serve both to further decrease the watt-density of the unit and to provide a means for supporting the water heater above the bottom of the watering tank.

Thus, in both embodiments, the present invention achieves accurate temperature sensing, and so overcomes both the fire hazard of prior art designs and the burn danger to drinking animals. Further, in both embodiments, the present invention overcomes the physical strength limitations of the prior art and thereby obviates the problem of accidental damage to the water heater.

BRIEF DESCRIPTION OF DRAWINGS

FIG. 1 is a partial side elevation of a first preferred embodiment of the present invention;

FIG. 2 is a partial bottom view of the first preferred embodiment of FIG. 1, taken substantially as shown by view line 2—2 of FIG. 1;

FIG. 3 is a partial cross section of the first preferred embodiment of FIGS. 1 and 2, taken substantially as shown by section line 3—3 of FIG. 2;

BEST MODES FOR CARRYING OUT THE INVENTION

Figure 5:
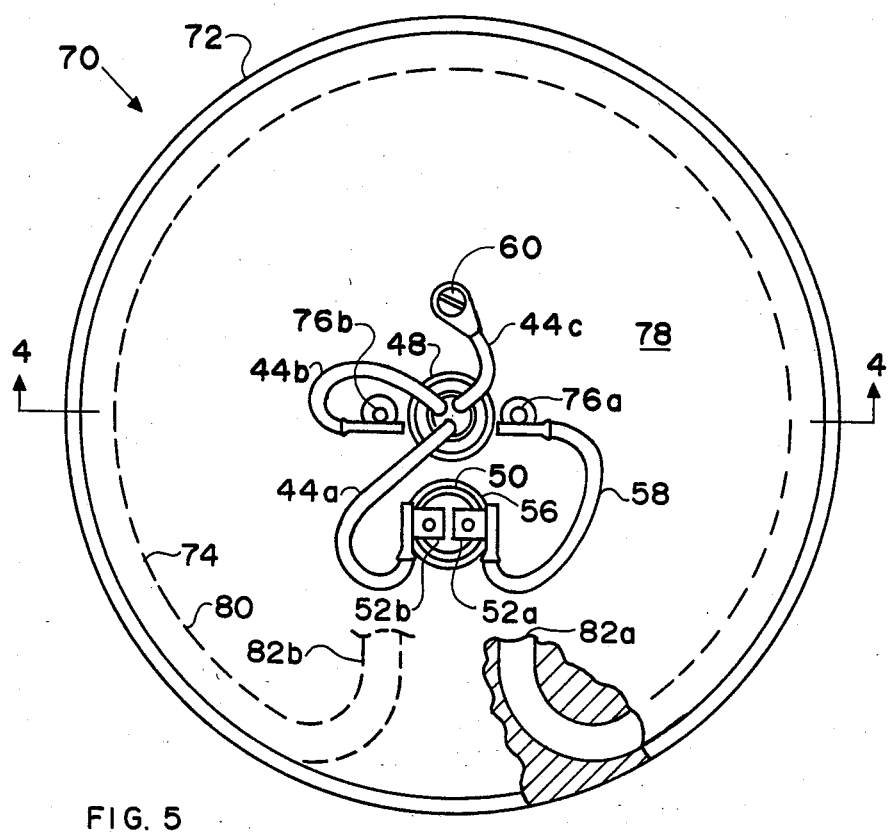
FIG. 5 is a top view of the second preferred embodiment of FIG. 4 taken substantially as shown by view line 5—5 of FIG. 4, as seen with the top housing portion and foamed plastic insert removed, and with a portion of the bottom housing portion broken away to show the heating element more clearly.

Referring now to the drawings, and more particularly to FIGS. 1-3, a livestock tank water heater 10 includes an electrical heating element 12 that is disposed circumferentially around, and radially outward from an axis 14. The heating element 12 includes ends 16a and 16b; and an electrical spade 18 is welded to respective ones of the ends 16a and 16b as shown for the end 16a in FIG. 3.

The heating element 12 is of the type that includes a steel jacket 13; and the heating element 12, together with the jacket 13 thereof, is molded into an aluminum housing portion 20.

The housing portion 20 includes a rim 22 that is disposed circumferentially around the axis 14, that encases the heating element 12 with the exception of the ends 16a and 16b, and is generally circular in cross section as shown by a circular cross section 24 of FIG. 1.

The rim 22 includes a plurality of fins 26 that are spaced at predetermined intervals around the rim 22 as indicated by radial lines 27, that are generally circular in shape as seen in FIG. 1, and that decrease the watt density of the water heater.

Each of the fins 26 is elongated downwardly by a projection 28; and the projections 28 cooperate with the fins 26 to support the water heater 10 above a bottom 30 of a watering tank 32.

The housing portion 20 includes a cup 34 that is interposed into the rim 22 and that cooperates with the rim 22 to completely encircle the axis 14.

The cup 34 includes a cavity 36 that opens downwardly, a boss 37 that projects upwardly from the cup 34, and an access opening 38 that opens upwardly through the boss 37. The ends 16a and 16b of the heating element 12 extend into the cavity 36.

A flexible electrical cable 40 includes a first end 42 and three conductors 44a-44c. The first end 42 enters the cavity 36 through the access opening 38, is retained in the access opening 38 by a cable retainer 46, and is hermetically sealed to the cup 34 by a sealant 48 which preferably is a silicone material.

A thermostatically controlled switch or thermostat 50, having terminals 52a and 52b, is bonded to a bottom surface 54 of the cavity 36 by a bonding agent 56 which preferably is an epoxy material.

The conductor 44a of the electrical cable 40 is attached to the terminal 52b of the thermostat 50, the terminal 52a of the thermostat 50 is connected to the end 16a of the heating element 12 by a jumper 58, and the conductor 44b is connected to the end 16b of the heating element 12. The conductor 44c of the electrical cable 40 is connected to the cup 34 by a screw 60, thereby providing an electrical ground for the water heater 10.

The cavity 36 is hermetically sealed by filling the cavity 36 with a polymer 62, which preferably is an epoxy resin. The polymer protects the thermostat 50 and the electrical connections from water, thereby assuring safe and reliable performance under water. The polymer 62 serves as a second housing portion in this preferred embodiment of the present invention.

Figure 4:
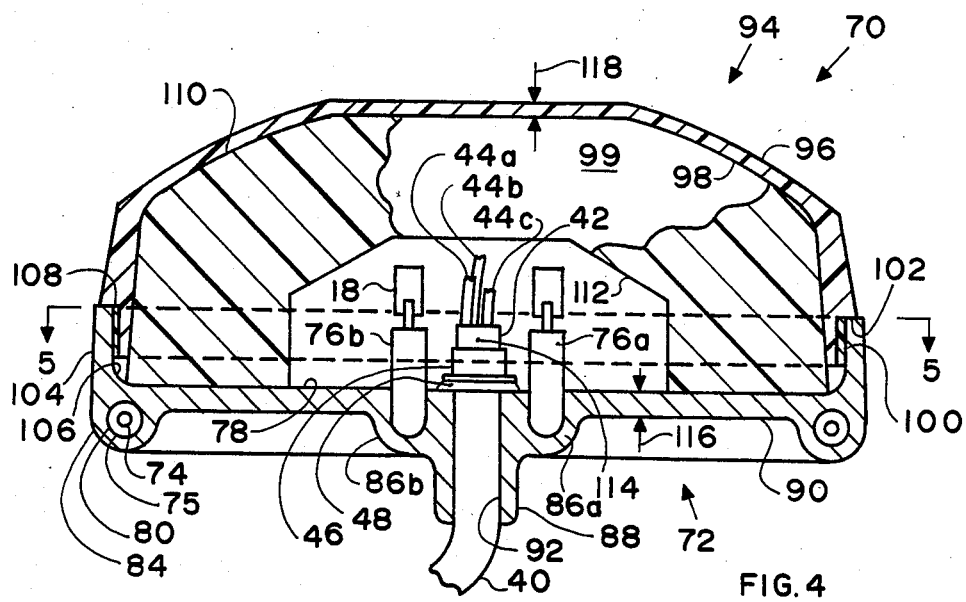
FIG. 4 is a cross sectioned elevation of a second preferred embodiment of the present invention, taken substantially as shown by section line 4—4 of FIG. 5.

Referring now to FIGS. 4 and 5, where names and numbers are identical with those used in conjunction with the description of the embodiment of FIGS. 1-3, the parts and functions are identical to those described above.

A livestock tank water heater 70 includes a bottom housing portion or first housing portion 72 of cast aluminum. An electrical heating element 74, that includes a steel jacket 75, is cast into the first housing portion 72. The heating element 74 includes ends 76a and 76b which extend upwardly from an inner surface 78 of the first housing portion 72.

The heating element 74 includes a substantially circular portion 80 and two legs, 82a and 82b, that extend inwardly from the substantially circular portion 80, that are substantially parallel one to the other, and that connect to respective ones of the ends 76a and 76b. An electrical spade 18 is attached to each of the ends 76a and 76b.

The first housing portion 72 includes a thickened rim 84 that provides sufficient cross sectional area to encase the circular portion 80 of the heating element 74, a pair of thickened portions, 86a and 86b, that provide sufficient cross sectional area to encase the legs 82a and 82b of the heating element 74, and a circular boss 88 that extends downwardly from a bottom 90 of the first housing portion 72. An access hole 92 that is vertically disposed and circular in cross section extends though the boss 88 and through the inner surface 78.

A flexible electrical cable 40 includes a first end 42 and conductors 44a-44c. The first end 42 and the conductors 44a-44c are inserted through the access hole 92. The first end 42 is retained in the access hole 92 by a cable retainer 46; and the cable is hermetically sealed to the first housing portion by a sealant 48.

A thermostatically controlled switch or thermostat 50 includes terminals 52a and 52b and is bonded to the inner surface 78 by a bonding agent 56.

The conductor 44a of the electrical cable 40 is attached to the terminal 52b of the thermostat 50, the terminal 52a of the thermostat is connected to the end 76a of the heating element 74 by a jumper 58, the conductor 44b is attached to the end 76b of the heating element 74, and the conductor 44c of the electrical cable 40 is connected to the inner surface 78 of the first housing portion 72 by a screw 60.

The livestock tank water heater 70 includes a top housing portion or second housing portion 94 that is molded from a polymer, and more preferably an elastomer modified styrene, generally known as ABS plastic. The second housing portion 94 is substantially circular and dome shaped, includes a domed outside surface 96, includes an inside surface 98 that defines a cavity 99, includes a reduced diameter portion 100, and includes a shoulder 102 that is juxtaposed to the reduced diameter portion 100.

The first housing portion 72 includes an upwardly standing flange 104 that is substantially circular in shape; and the flange 104 includes a circular inner surface 106.

The reduced diameter portion 100 of the top housing portion 94 is inserted into the circular inner surface 106 of the first housing portion 72 with the shoulder 102 abutting the flange 104. The second housing portion 94 is both mechanically attached to the first housing portion 72 and hermetically sealed thereto by a sealant 108 which preferably is a silicone material.

The second housing portion 94 is strengethened by a foamed plastic liner 110; and the preferred material for the plastic liner 110 preferably is a molded polystyrene that is molded before assembly, but which may be a polyurethane that is foamed in place.

The foamed plastic liner 110, if premolded, includes a cavity 112 that is circular, and that provides space for the thermostat 50, the conductors 44a–44c, the ends 76a and 76b of the heating element 74, and the jumper 58.

The livestock tank water heater 70 floats in water because the specific gravity of the water heater 70 is less than 1.0.

The specific gravity is maintained less than unity and yet adequate strength is achieved to resist the weight of a farm animal even though the bottom housing portion 72 is thick to provide adequate heat transfer and has a specific gravity of approximately 2.7 by: molding the second housing portion 94 from a plastic, and strengthening the second housing portion 94 with a foamed plastic insert 110.

Accurate temperature control and obviating of a fire hazard are achieved by molding the heating element 74 into the first housing portion 72 of molded aluminum, and by bonding the thermostat 50 to the first housing portion 72; so that the thermostat 50 senses a temperature that is close to being the highest temperature of the first housing portion 72.

Self righting of the water heater 70 is achieved by the location of a center of gravity 114 closer to the bottom 90 of the first housing portion 72 than to the domed outside surface 96 of the second housing portion 94, by the domed shape of the outside surface 96 of the second housing portion 94 not providing stability when the water heater 70 is in an inverted position, and by the weight of the electrical cable 40 extending downwardly from the first housing portion 72.

The center of gravity 114 is low, as shown, for the water heater 70, by virtue of the first housing portion 72 having a relatively thicker cross section 116 as compared to a cross section 118 of the second housing portion 94.

Further, since the specific gravity of the aluminum, which is the material of the first housing portion 72, is approximately twice the specific gravity of the plastic, which is the material of the second housing portion 94, the center of gravity is shifted downward toward the bottom surface 90 of the first housing portion 72.

Since the material of the foamed plastic liner 110 is light in comparison both to the molded aluminum of the first housing portion 72 and the molded plastic of the second housing portion 94, the foamed plastic liner 110 shifts the center of gravity 114 upward only slightly.

Also, the weight of the heating element 74 is centered slightly lower than the bottom 90 of the first housing portion 72; so the heating element 74 shifts the center of gravity downward.

Preferably, the reduced diameter portion 100 is sized to provide a radial clearance of 0.75 millimeters between the reduced diameter portion 100 and the inner surface 106 of the flange 104.

The purpose for this radial clearance is to allow the silicone material of the sealant 108 to absorb a portion of the stress in the bond between the lower housing portion 72 and the top housing portion 94 that is caused by the difference in the rates of thermal expansion of the lower portion 72 and the top housing portion 94.

Both the first embodiment of FIGS. 1-3 and the second embodiment of FIGS. 4 and 5 have the advantage of low watt densities as compared to the prior art. Because of the excellent conductivity of aluminum and the relatively thick cross sectional areas of the first housing portions, 20 and 72, the watt densities of the water heaters 10 and 70, are approximately two watts per square centimenter.

In contrast, considering that prior art designs either had the heating element separate from the float, or else brazed to the float with a majority of the heating element exposed to the water, the watt densities of the prior art must be above 8 watts per square centimeter.

The primary advantage of the lowered watt density of both of the embodiments described herein, as compared to prior art, is a reduction in the danger of an animal being burned as it drinks.

The lowered watt densities have been achieved by molding the heating element into an aluminum housing and, by both the excellent heat conductivity and the relatively heavy cross sectional areas of the cast aluminum.

In summary, both of the embodiments described herein have the advantage of accurate temperature control to reduce the fire risk from a unit that is tossed from the livestock watering tank by a drinking animal. This accurate temperature control is achieved by molding the heating element into an aluminum housing and by bonding a thermostat to a surface of the aluminum housing.

Both of the embodiments achieve reduced watt densities for increased safety to drinking animals and for additional reduction of fire hazard.

Both of the embodiments herein provide means for supporting the unit above the bottom of the watering tank. The water heater 10 uses the fins 26 and the projections 28, and the water heater 70 uses a specific gravity that is less than unity and the resultant buoyancy.

While particular apparatus have been described, it should be understood that the scope of the present invention is to be limited only by the scope of the appended claims.

INDUSTRIAL APPLICABILITY

The present invention is applicable for use in preventing water from freezing in livestock watering tanks during cold weather; and the present invention is applicable for maintaining the water in livestock watering tanks to a temperature that will increase the water consumption of animals being fattened for market.

What is claimed is:

1. A water heater for seasonal insertion into a stock watering tank, which water heater comprises:
   a first housing portion of molded aluminum;
   a second housing portion;
   means, comprising one of said housing portions, for providing a cavity;
   an elongated electric heating element being molded into said first housing portion, and having first and second ends that extend from said first housing portion into said cavity;
   a thermostatically controlled switch being disposed in said cavity, being bonded to said first housing portion, having a first terminal that is electrically connected to said first end of said heating element, and having a second terminal;

access means, for inserting an electrical cable into said cavity;

a flexible electrical cable extending through said access means, having a first end that is disposed in said cavity, having a first conductor that is electrically connected to said second terminal, and having a second conductor that is electrically connected to said second end of said heating element; and means for hermetically sealing said cavity.

2. A water heater as claimed in claim 1 in which said water heater includes means for supporting said first housing portion above the bottom of a stock watering tank.

3. A water heater as claimed in claim 2 in which said means for supporting said first housing portion above said bottom of said stock watering tank comprises a plurality of projections that extend downwardly from said first housing portion.

4. a water heater as claimed in claim 2 in which said means for supporting said first housing portion above said bottom of said stock watering tank comprises a specific gravity of said water heater that is less than 1.0.

5. A water heater for seasonal insertion into a stock watering tank, which water heater comprises:
   an elongated electric heater element being disposed radially outward from a first axis, having first and second ends that are disposed proximal to one another, and substantially enclosing an area around said first axis,
   aluminum housing means, comprising a rim portion that is disposed radially outward from said first axis, and comprising a cup portion that is interposed into the rim and that includes a cavity therein and that cooperates with said rim portion to complete encircling of said axis, for substantially encasing said heating element in said rim portion, and for receiving said first and second ends of said heating element in said cavity of said cup portion;
   a thermostatically controlled switch being disposed in said cavity, being bonded to said cup portion, having a first terminal that is electrically connected to said first end of said heating element, and having a second terminal;
   an access hole being disposed in said cup portion;
   a flexible electrical cable extending through said access hole, having a first end that is disposed in said cavity, having a first conductor that is electrically connected to said second terminal, and having a second conductor that is electrically connected to said second end of said heating element; and
   means for hermetically sealing said cavity.

6. A water heater as claimed in claim 5 in which said substantial enclosing of an area around said first axis by said heating element comprises a substantially circular shape of said heating element; and
   said rim portion of said aluminum housing means includes a substantially circular cross section.

7. A water heater as claimed in claim 5 in which said rim portion includes projection means for supporting said rim portion above the bottom of a stock watering tank.

8. A water heater as claimed in claim 5 in which said cavity opens downwardly;
   said access hole opens upwardly from said cup;
   said means for hermetically sealing said cavity comprises filling said cavity with a polymer; and
   said means for bonding said thermostatically controlled switch to said cup portion comprises an expoxy material.

9. A water heater as claimed in claim 5 in which said substantial enclosing of an area around said first axis by said heating element comprises a substantially circular shape of said heating element;
   said substantial encasing of said heating element by said rim portion comprises a substantially circular shape of said rim portion;
   said rim portion includes a plurality of fins that are cast integral with said rim portion, and that are disposed at spaced intervals around said substantially circular shape;
   said cavity of said cup portion opens downwardly;
   said access hole opens upwardly from said cup portion;
   said hermetical sealing of said cavity comprises filling said cavity with a polymer; and
   said bonding of said thermostatically controlled switch to said first housing portion comprises an epoxy material.

10. A water heater as claimed in claim 9 in which said rim portion includes a cross section that is substantially circular;
    said fins extend radially outward from said substantially circular cross section of said rim portion and are generally circular in shape; and
    said fins include projections that extend downwardly from said generally circular shape.

11. A water heater for seasonal insertion into a stock watering tank, which water heater comprises:
    a bottom housing portion of molded aluminum;
    a top housing portion;
    means, comprising one of said housing portions, for providing a cavity that is disposed intermediate of said housing portions and that is enclosed by said housing portions;
    an elongated electric heating element being molded into said bottom housing portion, and having first and second ends that extend from said bottom housing portion and into said cavity;
    a thermostatically controlled switch being disposed in said cavity, being bonded to said bottom housing portion, having a first terminal that is electrically connected to said first end of said heating element, and having a second terminal;
    access means, for inserting an electrical cable into said cavity;
    a flexible electrical cable extending through said access means, having a first end that is disposed in said cavity, having a first conductor that is electrically connected to said second terminal, and having a second conductor that is electrically connected to said second end of said heating element;
    means for hermetically sealing said cavity;
    means, for maintaining said water heater at a specific gravity that is less than 1.0, whereby said water heater will float in water; and
    means for righting said water heater whenever said bottom portion is accidentally turned upwardly in said watering tank.

12. A water heater as claimed in claim 11 in which said means for righting said water heater comprises the location of the center of gravity of said water heater.

13. A water heater as claimed in claim 11 in which said means for righting said water heater comprises the shape of said top housing portion.

14. A water heater as claimed in claim 11 in which said means for righting said water heater comprises said flexible cable extending downwardly from said bottom housing portion.

15. A water heater as claimed in claim 11 in which said means for righting said water heater comprises locating the center of gravity of said water heater within said bottom housing portion, a domed shape of said top housing portion, and said flexible cable extending downwardly from said bottom housing portion.

16. A water heater as claimed in claim 11 in which said top housing portion is molded plastic; and
said one housing portion comprises said top housing portion.

17. A water heater as claimed in claim 16 in which said hermetical sealing of said cavity comprises bonding said top housing portion to said bottom housing portion; and
said bonding of said thermostatically controlled switch to said bottom housing portion comprises an epoxy material.

18. A water heater as claimed in claim 16 in which said one housing portion comprises said top housing portion;
said top housing portion includes strengthening means, comprising a foamed plastic liner that is disposed in said cavity, for increasing the ability of said top housing portion to withstand the weight of a farm animal.

19. A water heater as claimed in claim 11 in which said top housing portion is molded plastic;
said one housing portion comprises said top housing portion;
said hermetical sealing of said cavity comprises bonding said top housing portion to said bottom housing portion;
said top housing portion includes strengthening means, comprising a foamed plastic liner that is disposed in said cavity, for increasing the ability of said top housing portion to withstand the weight of a farm animal; and
said means for righting said water heater comprises locating the center of gravity of said water heater within said bottom housing portion, a domed shape of said top housing portion, and said flexible cable extending downwardly from said bottom housing portion.

* * * * *

UNITED STATES PATENT AND TRADEMARK OFFICE
CERTIFICATE OF CORRECTION

PATENT NO. : 4,599,973

DATED : July 15, 1986

INVENTOR(S) : Richard E. Ward, 11040 4A Road, Plymouth, Indiana 46563

It is certified that error appears in the above-identified patent and that said Letters Patent is hereby corrected as shown below:

In the claims, Claim 5: Column 7, line 26, "heater" should read -- heating --.

Signed and Sealed this

Twenty-first Day of October, 1986

[SEAL]

Attest:

DONALD J. QUIGG

Attesting Officer

Commissioner of Patents and Trademarks